(12) United States Patent
Fankhauser et al.

(10) Patent No.: US 9,366,310 B2
(45) Date of Patent: Jun. 14, 2016

(54) PLANAR COMPONENT WITH VIBRATION DAMPING

(75) Inventors: Christoph Fankhauser, Hausmannstaetten (AT); Michael Vorraber, Krottendorf (AT)

(73) Assignee: MAGNA STEYR Fahrzeugtechnik AG & Co. KG, Graz (AT)

( * ) Notice: Subject to any disclaimer, the term of this patent is extended or adjusted under 35 U.S.C. 154(b) by 756 days.

(21) Appl. No.: 13/201,985

(22) PCT Filed: Feb. 19, 2010

(86) PCT No.: PCT/EP2010/052166
§ 371 (c)(1),
(2), (4) Date: Aug. 17, 2011

(87) PCT Pub. No.: WO2010/094786
PCT Pub. Date: Aug. 26, 2010

(65) Prior Publication Data
US 2011/0298334 A1  Dec. 8, 2011

(30) Foreign Application Priority Data

Feb. 19, 2009 (DE) .......................... 10 2009 009 702

(51) Int. Cl.
*H01L 41/08* (2006.01)
*F16F 15/00* (2006.01)

(52) U.S. Cl.
CPC ....... *F16F 15/005* (2013.01); *F16F 2224/0283* (2013.01)

(58) Field of Classification Search
USPC .................................................. 310/321, 325
See application file for complete search history.

(56) References Cited

U.S. PATENT DOCUMENTS

| 2,620,070 | A | 12/1952 | Dodge |
| 4,626,730 | A | 12/1986 | Hubbard, Jr. |
| 6,375,127 | B1* | 4/2002 | Appa ............................ 244/215 |
| 6,600,323 | B2 | 7/2003 | Kieres et al. |
| 6,607,247 | B2 | 8/2003 | Becker et al. |
| 7,360,996 | B2* | 4/2008 | Driver ........................... 416/226 |
| 2002/0101135 | A1 | 8/2002 | Giovanardi et al. |
| 2006/0061744 | A1 | 3/2006 | Mensler et al. |
| 2007/0128025 | A1* | 6/2007 | Driver ............................. 416/23 |
| 2008/0023259 | A1* | 1/2008 | Muto et al. .................... 181/151 |

FOREIGN PATENT DOCUMENTS

| DE | 3834853 C2 | 12/1999 |
| DE | 10042850 A1 | 3/2002 |
| DE | 102005044448 B3 | 12/2006 |
| EP | 0720144 | 7/1996 |

(Continued)

OTHER PUBLICATIONS

Jingjun Zhang et al: "A LQR controller design for active vibration control of flexible structures", IEEE Pacific-Asia Workshop on Computational Intelligence and Industrial Application—PACIIA 2008, Wuhan, China, vol. 1, 19, Dec. 19, 2008-Dec. 20, 2008, pp. 127-132, XP002593982.

*Primary Examiner* — J. San Martin
(74) *Attorney, Agent, or Firm* — Bachman & LaPointe, P.C.

(57) ABSTRACT

A planar component (1), in particular a sheet metal element, which is provided with at least one piezoelectric actuator (7-9) for its active vibration damping, wherein the piezoelectric actuator (7-9) is applied to the inside or the outside (15) of a bead (3-5) formed in the component.

9 Claims, 3 Drawing Sheets

(56) References Cited

FOREIGN PATENT DOCUMENTS

| JP | 2002005228 A | 1/2002 |
| WO | 9716048 | 5/1997 |
| WO | 03019204 A2 | 3/2003 |
| WO | 2006030672 A1 | 3/2006 |

* cited by examiner

PLANAR COMPONENT WITH VIBRATION DAMPING

BACKGROUND OF THE INVENTION

The present invention relates to a planar component, in particular a sheet metal element, which is provided with at least one piezoelectric actuator for its active vibration damping.

Using piezoelectric actuators for feeding vibration-eliminating structure-borne sound into a mechanical structure is known, for example, from U.S. Pat. No. 4,626,730, EP 0 720 144 or WO 97/16048. The piezoelectric actuators are operated in a feedback control circuit with vibration sensors located at places of maximum vibration amplitude, in order to provide an actual value for the feedback control target of vibration minimization.

The known systems presently do not deal with optimization of coupling the piezoelectric sound into the component with regard to maximally damping various oscillation modes of the component. It is an object of the invention to solve this problem.

SUMMARY OF THE INVENTION

To achieve the object, the invention provides a planar component, in particular a sheet metal element, which has at least one piezoelectric actuator for its active vibration damping and is characterized in that the piezoelectric actuator is applied to the inside or the outside of a bead formed in the component.

In this way, places of particularly high inherent rigidity are provided for feeding in the structure-borne sound of the piezoelectric actuators, which—as will be explained in more detail hereinafter—enable the greatest possible mutual decoupling of the excitation points of the component. Due to this, on the one hand, precise calculation and control of the compensation signals and, on the other hand, optimal propagation and optimum effect of the elimination signal can be obtained. As a result, a significantly higher amount of structure-borne sound energy can be produced in the component as compared to known arrangements at the same electrical energy level.

Furthermore, the bead depth can be reduced due to active damping of the component without impairing mechanical strength, whereby starting material and/or work steps can be saved during beading or lock beading ("canaluring").

It is especially advantageous if the piezoelectric actuator is applied to the bead at a place of maximum curvature of the bead, whereby maximum inherent rigidity can be achieved for the place where sound is fed in.

It is in particular advantageous if the piezoelectric actuator is applied to the bead at a place having maximum convex curvature as seen in the direction of its extension, which largely excludes possible detachment of the piezoelectric actuator at its piezostriction.

According to another preferred embodiment of the invention, the component is provided with at least one bead per each basic oscillation mode for damping its basic oscillation modes, which brings about its mechanical stiffening in this mode. In this way, the beads serve both for stiffening purposes as well as for feeding in the elimination signal, and vibration damping is performed in exactly the significant oscillation modes.

It is especially favorable if according to another feature of the invention the sheet metal element is provided with at least two beads extending perpendicularly to one another, each carrying one piezoelectric actuator. In this way, it is possible to additionally dampen vibration modes in intermediate directions by means of a corresponding vectorial mixture of the sound input in the two perpendicular directions.

In an especially preferred embodiment of the invention, the component is provided with a central annularly extending bead and at least four, preferably eight, beads extending radially outwardly therefrom, wherein at least two of the beads each carry one piezoelectric actuator. The annular bead mechanically counteracts to the oscillation mode of bulging ("bulging mode"), and the radial beads to the bending and torsional modes; by means of a vectorial mixture of the sound input into the piezoelectric actuators at the radial beads, however, acoustic elimination in all three modes can be achieved, which reduces the number of required piezoelectric actuators.

It is especially advantageous if the piezoelectric actuator is a flexible piezoelectric film adhering to the curvature of the bead. In this way, maximum efficiency of the force fed into the component by the piezoelectric actuators can be achieved.

Preferably, the piezoelectric actuator has at least one distinctive piezostriction direction and is oriented with this direction in parallel to the extension of the bead. The striction force of the piezoelectric actuator thus acts exactly in the direction of bead extension, enabling to achieve maximum sound yield.

According to another preferred feature of the invention, the piezoelectric actuator can be glued in a simple manner to the component, wherein it is preferable to arrange the piezoelectric actuator in the convex area of the bead in order to reduce the risk of the piezoelectric actuator being detached during operation.

BRIEF DESCRIPTION OF THE DRAWINGS

Hereinafter the invention will be explained in more detail by way of exemplary embodiments shown in the accompanying drawings, wherein.

DETAILED DESCRIPTION

Figure 1:
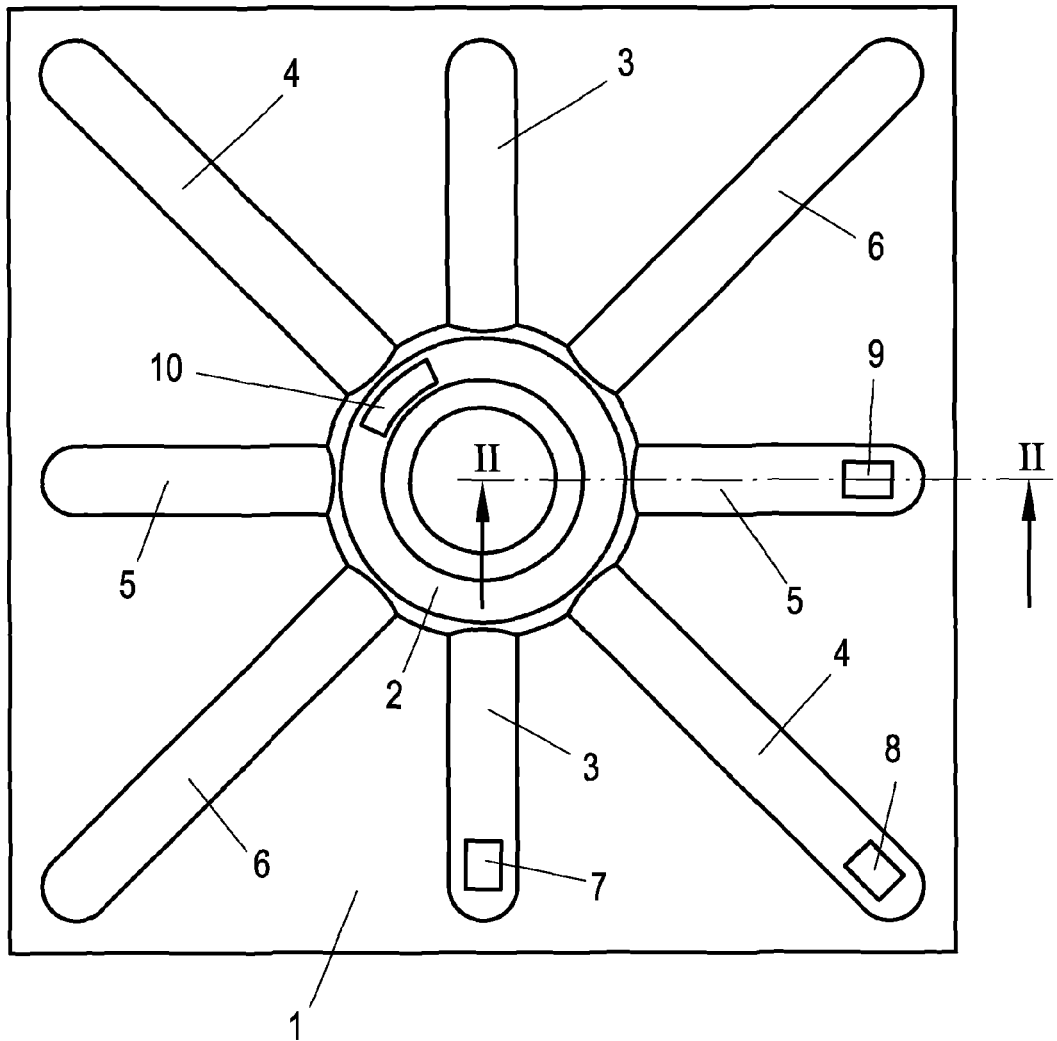
FIG. 1 shows a plan view of a component of the invention.

FIG. 1 shows a planar component 1 embodied as a plane sheet-metal panel. For stiffening purposes, the component 1 is provided with a central annular bead 2 and beads 3-6 extending radially outwardly therefrom in a direction to form channels. The beads 3-6 are arranged corresponding to the basic oscillation modes of the component 1 such that each of the beads 3-6 stiffens it against one basic oscillation mode, namely

- the annularly extending bead 2 for stiffening it against the bulging mode,
- the beads 3, 5 extending longitudinally and transversely for stiffening it against the bending modes, and
- the diagonal beads 4, 6 for stiffening it against the torsional modes.

In the example shown, each of the beads 3-5 is equipped with a respective piezoelectric actuator 7-9 for feeding structure-borne sound (vibration) into the component 1. A sensor 10 for structure-borne sound (vibration), preferably a film-shaped piezoelectric converter, rests on the component 1 at a place distant from the piezoelectric actuators 7-9. The place of the vibration sensor 10 is chosen such that it is excited in possibly every oscillation mode of the component 1.

By means of an electronic control device (not shown), usually a correspondingly programmed signal processor, the piezoelectric actuators 7-9 are charged with electrical signals in such a way that they produce structure-borne sound due to their piezostriction effect and feed it as elimination sound into the component 1, compensating inherent vibrations of the component 1. For this, the control device receives a measurement signal from the vibration sensor 10 and pursues the feedback control target of minimizing this measurement signal.

As known from theoretical acoustics, the acoustical behavior of the component 1 can be modeled by means of a lattice of excitation points with acoustical point admittances $Y_{ii}$ and mutual acoustical transfer admittances $Y_{ik}$. The acoustic power P fed into the component 1 is thus distributed to $$P = \sum_{i=1}^{N} \frac{|F_i|^2}{2} \cdot \left[ Re\{Y_{ii}\} + 2 \cdot \sum_{k=1}^{i-1} Re\left\{\frac{F_k}{F_i}\right\} \cdot Re\{Y_{ik}\} \right]$$

wherein $$Y_{ik} = \frac{v_i}{F_k}$$

point admittance (i=k) or transfer admittance (i≠k)
$v_i$ . . . speed in excitation point i
$F_k$ . . . force in excitation point k Accordingly, if the transfer admittances $Y_{ik}$ between individual excitation points are high, active vibration damping at an excitation point is strongly reduced by admittance decreases as a result of the respective other forces, resulting in the fact that a reduction of the transfer admittances $Y_{ik}$ relative to the point admittances $Y_{ii}$, i.e. the provision of input points which are as rigid as possible and correlate as little as possible with one another, is able to improve the effectiveness of active vibration damping. For this purpose, the piezoelectric actuators 7-9 are arranged as follows.

Figure 2:
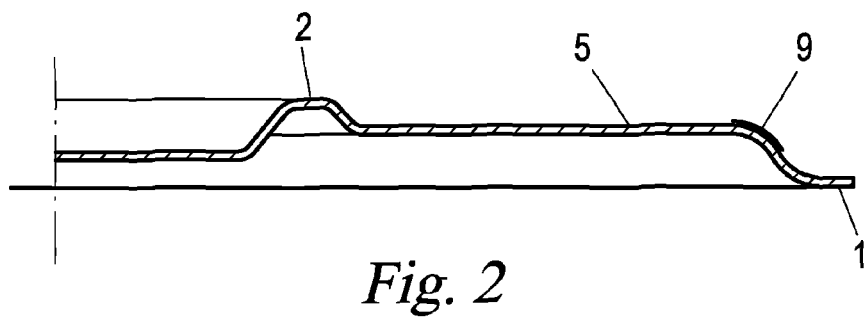
FIG. 2 shows a sectional view of the component taken along the cutting line II-II of FIG. 1.
Figure 3:
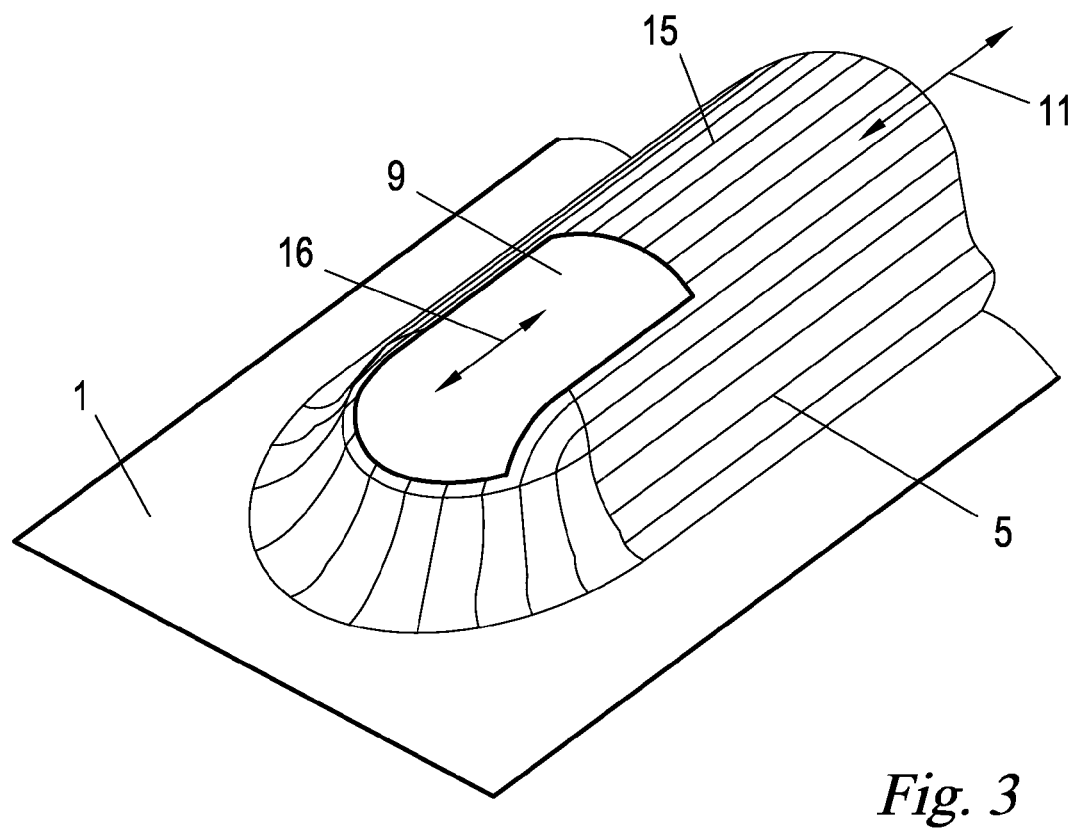
FIG. 3 shows a partial perspective view of one of the beads of the component of FIG. 1.
Figure 4:
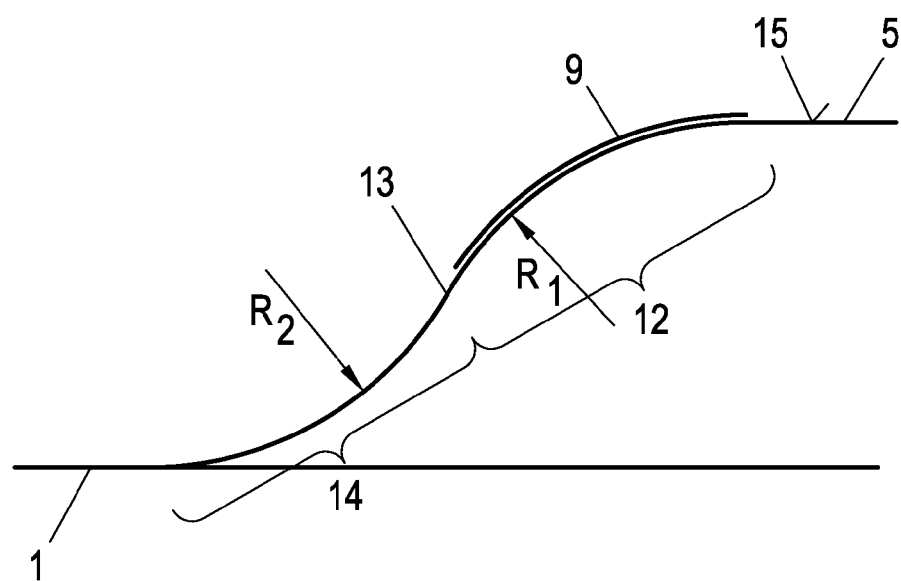
FIG. 4 shows a partial sectional view of one of the beads of the component of FIG. 1 taken along a cutting line in the direction of the bead extension.

FIGS. 2 to 4 show—representatively for all piezoelectric actuators—the piezoelectric actuator 9 and its bead 5 in detail. Preferably, the piezoelectric actuator 9 is located at the place of maximum convex curvature of the bead 5, wherein the curvature is seen in the direction of the extension 11 of the bead 5. The bead 5 extends at each of its ends in a sequence from a convex area 12 via a reversal point 13 and a concave area 14 into the surrounding plane of the component 1, and the piezoelectric actuator 9 is applied preferably in the convex area 12 to the outside 15 of the bead 5. The radiuses $R_1$ and $R_2$ of the convex curvature area 12 and the concave curvature area 14, respectively, of the bead 5 are, for example, in the range from 20 to 2,000 mm.

Each of the piezoelectric actuators 7-9 may be of an omnidirectional piezorestrictive type or—preferably—have a distinctive piezostriction direction 16 oriented preferably in parallel to the extension 11 of the respective bead 3-5. Due to this, the piezoelectric actuators 7-9 generate tension stresses over the curvature area 12, which are able to propagate exactly along the bead extension 11.

If desired, one or several piezoelectric actuators—even though with reduced acoustic effectiveness or a risk of detachment—may alternatively be applied to a convex area of the inside of a bead, in a concave area to the inside or the outside of a bead and/or transversely or obliquely to the bead extension.

The piezoelectric actuators 7-9 are embodied as flexible piezoelectric films (piezofilms), as known per se, for example, from U.S. Pat. No. 4,626,730. The piezoelectric actuators 7-9 are glued to the beads 3-5 and fit tightly to the curvature of the convex area 12.

The length of the piezoelectric actuators 7-9 in the direction of the bead extension 11 is adapted to the wavelength of the respective oscillation mode to be damped, in particular in such a way that the length is not an integer divisor of the oscillation mode, in order to avoid resonant excitation of harmonic oscillations.

A component 1 is provided with the number of piezoelectric actuators 3-5 necessary for damping the main or basic vibration modes of the component 1. In the case of the planar component 1 of FIG. 1, at least two beads extending perpendicularly, herein the beads 3 and 5, are provided with piezoelectric actuators. By means of vectorial control of the piezoelectric actuators 7, 9, i.e. by correspondingly offsetting the amplitudes and phases of their control signals, it is possible to additionally compensate oscillation modes with intermediate directions, for example, in the direction of the diagonal beads 4, 6, so that the shown third piezoelectric actuator 8 may be dispensed with, where applicable.

Figure 5:
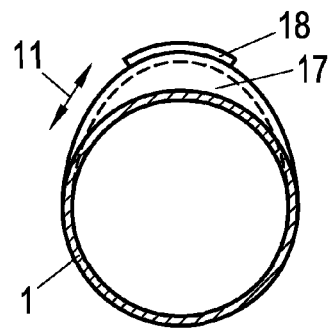
FIGS. 5 and 6 show various variants of beads applied to components.
Figure 6:
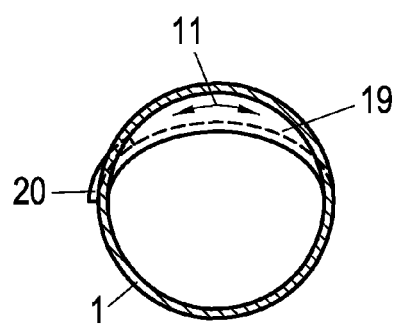

The component 1 may, in principle, have any shape and be of any material as long as it allows the formation of beads. FIGS. 5 and 6 show examples of non-planar components 1 embodied as a tube carrying an outwardly formed bead 17 having a piezoelectric actuator 18 and carrying an inwardly formed bead 19 having a piezoelectric actuator 20, respectively. The piezoelectric actuators 18, 20 are each applied at the place of maximum convex curvature of the beads 17 and 19, respectively, which in FIG. 5 is the central area of the bead 17 and in FIG. 6 the transitional area of the bead 19 to the component 1.

Figure 7:
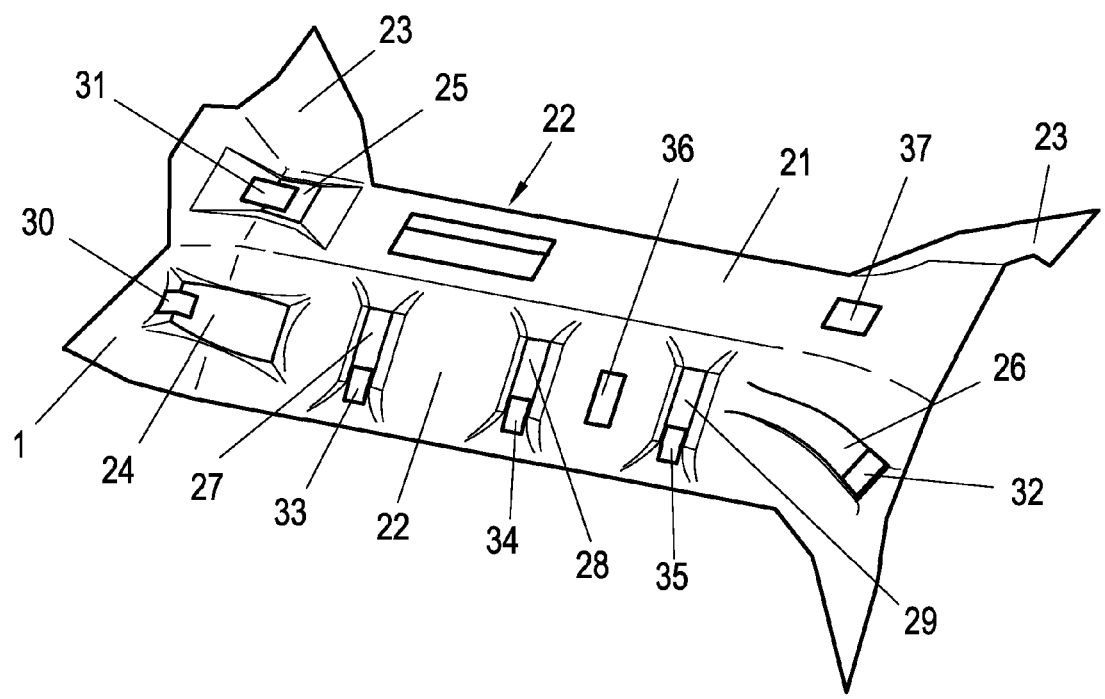
FIG. 7 shows a perspective view of a further component of the invention embodied as a transmission tunnel.

FIG. 7 shows still another embodiment of a very irregularly shaped component 1, namely a sheet-metal tunnel for a motor vehicle chassis, comprising a web plate 21, adjacent apron plates 22 at both sides thereof and end-side front and rear plates 23. Longitudinal beads 24-26 serve for stiffening the component 1 against the basic oscillation mode of longitudinal bending, and transverse beads 27-29 serve for stiffening the component 1 against the basic oscillation mode of bulging of the apron plates.

The beads 24-29 are provided with piezoelectric actuators 30-35, each of which is located in the area of maximum convex bead curvature in the direction of the bead extension. Piezoelectric converters 36, 37 at the places of maximum vibration amplitude take off the feedback control signal for controlling the piezoelectric actuators 30-35.

It is understood that the system presented herein for actively damping vibration could be used in an analogous manner also for actively generating sound in the component 1.

Furthermore, beads provided with the piezoelectric-actuator damping described here can be manufactured with a smaller bead depth and a shorter bead extension than without damping—while the mechanical strength is maintained—, resulting in a reduction of manufacturing costs.

The invention is not limited to the embodiments shown, but comprises all variants and modifications falling within the scope of the attached claims.

The invention claimed is:

1. A planar component comprising a sheet metal element having a bead formed thereon, at least one piezoelectric actuator for active vibration damping, wherein the piezoelectric actuator is applied to an inside or an outside of a bead, wherein the bead has a place of maximum curvature and the piezoelectric actuator is applied to the bead at the place of maximum curvature of the bead, wherein the sheet element is provided with at least one bead per each basic oscillation mode for damping the basic oscillation modes, which brings about its mechanical stiffening in this mode.

2. A planar component comprising a sheet metal element having a bead formed thereon, at least one piezoelectric actuator for active vibration damping, wherein the piezoelectric actuator is applied to an inside or an outside of a bead, wherein the bead has a place of maximum curvature and the piezoelectric actuator is applied to the bead at the place of maximum curvature of the bead, wherein the sheet element is provided with at least two beads extending perpendicularly with respect to one another and each bead carries one piezoelectric actuator.

3. A planar component comprising a sheet metal element having a bead formed thereon, at least one piezoelectric actuator for active vibration damping, wherein the piezoelectric actuator is applied to an inside or an outside of a bead, wherein the bead has a place of maximum curvature and the piezoelectric actuator is applied to the bead at the place of maximum curvature of the bead, wherein the sheet element is provided with a central annularly extending bead and at least four beads extending radially outwardly therefrom, wherein at least two of the beads each carry one piezoelectric actuator.

4. A planar component comprising a sheet metal element having a bead formed thereon, at least one piezoelectric actuator for active vibration damping, wherein the piezoelectric actuator is applied to an inside or an outside of a bead, wherein the bead has a place of maximum curvature and the piezoelectric actuator is applied to the bead at the place of maximum curvature of the bead, wherein an outer surface of the bead at the bead end extends via a convex/concave sequence into a plane of the component and that the piezoelectric actuator is located in a convex area of the convex/concave sequence.

5. The component according to one of claim 1, 2, 3 or 4, wherein the bead has a place of maximum convex curvature and is extended in a direction to form a channel and the piezoelectric actuator is applied to the bead at the place of maximum convex curvature as seen in the direction of the bead extension.

6. The component according to one of claim 1, 2, 3 or 4, wherein the piezoelectric actuator is a flexible piezofilm adapting to the curvature of the bead.

7. The component according to claim 5, wherein the piezoelectric actuator is a flexible piezofilm adapting to the curvature of the bead.

8. The component according to one of claims 1, 2, 3 or 4, wherein the piezoelectric actuator has at least one distinctive piezostriction direction and the bead is extended in a direction to form a channel, wherein the piezostriction direction is oriented in parallel to the extension of the bead.

9. The component according to one of claim 1, 2, 3 or 4, wherein the piezoelectric actuator is glued to the component.

* * * * *